United States Patent Office 3,221,021
Patented Nov. 30, 1965

3,221,021
ACYLATED OXAZOLIDINONES
Richard A. Hickner, Midland, Mich., assignor to The Dow Chemical Company, Midland, Mich., a corporation of Delaware
No Drawing. Filed Feb. 24, 1964, Ser. No. 347,036
3 Claims. (Cl. 260—307)

This is a continuation-in-part of application Serial No. 173,350, filed February 15, 1962, now abandoned.

This invention relates to acylated oxazolidinones as new chemical compounds.

The compounds of the present invention have the formula:

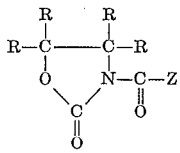

where each R is either hydrogen or a lower alkyl radical and Z represents a halophenoxymethyl group containing from 1 to 3 halogen atoms, said halogens having an atomic number from 17 to 35. More particularly, the invention relates to those sub-genera wherein Z is a chlorophenoxymethyl group or a bromophenoxymethyl group containing from 1 to 3 chlorine atoms or from 1 to 3 bromine atoms, respectively.

The term "lower alkyl" is used herein to include alkyl groups containing from 1 to 4 carbon atoms.

The novel compounds of the present invention are conveniently prepared by reacting by contacting a 2-oxazolidinone having the formula:

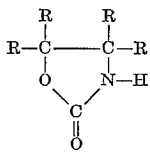

where R has the same significance as previously described, with an appropriate acid anhydride or acyl chloride. The components are allowed to react until conversion to the desired product is substantially complete; normally from six to eight hours are sufficient. The temperature during the reaction is maintained at from about 60 to about 200° C., with temperatures from about 80 to about 130° C. being preferred. A solvent for the reaction mixture may be used, if desired. At the conclusion of the reaction, the solvent, where employed, may be removed by distillation and the product may be purified, if desired, by distillation or by recrystallization from a suitable solvent, such as ethanol.

The following example illustrates the present invention.

Example 1

20 g. (0.2 gram-mole) of 5-methyl-2-oxazolidinone, 47.9 g. (0.2 gram-mole) of 2,4-dichlorophenoxy-acetyl chloride, and 70 ml. of toluene were charged to a round-bottomed flask fitted with a mechanical stirrer, condenser and thermometer well. The mixture was heated at 100° C. for eight hours and then allowed to cool to room temperature. The reaction product which precipitated during the cooling was separated by filtration and recrystallized from ethanol. These were obtained 44.7 g. representing a yield of 73 percent of theoretical, of 5-methyl-3-(2,4-dichlorophenoxyacetyl)-2-oxazolidinone melting at 134–137° C.

In addition to those compounds specifically disclosed herein, other 2-oxazolidinones and acyl chlorides and acid anhydrides within the scope of the present invention may be employed, such as for example, 4,4-dimethyl-, 4-methyl-5-ethyl-, 4,5-diethyl-, 4,5-dimethyl-, 4,5-diethyl-, 4-ethyl-5-n-propyl-, and 4-n-butyl-5-sec-butyl-2-oxazolidinones, and 2-chloro-, 4-chloro-, 2,5-dichloro-, 2,6-dichloro-, 2,4,5-trichloro-, and 2,4,6-trichlorophenoxyacetyl chlorides, and 2,4-dibromo-, 2,5-dibromo-, and 2,4,5-tribromophenoxyacetyl chlorides, and the corresponding acylated 2-oxazolidinones derived therefrom.

The compounds of the present invention possess valuable utilities as agents for killing aquatic weeds and as preemergent herbicides. These utilities were demonstrated in several series of experiments that were carried out as follows:

(1) The compound prepared in the example was evaluated as an agent for killing aquatic weeds by immersing numerous specimens of Ceratophyllum sp. into an aqueous dispersion containing 10 parts per million of the test compound and allowing the specimens to remain therein for three weeks. The specimens were then withdrawn and inspected to determine the mortality rate. It was found that the compound of the example had effected a kill of 75 percent when compared with untreated controls.

(2) The compound prepared in the example was evaluated as a preemergent herbicide by applying an aqueous dispersion containaing approximately 20 parts per million of the test compound to each of numerous pots, each containing approximately 100 cubic inches of soil where the soil at the surface measured 5" in diameter, the pots having been seeded with seeds of radish and German millet, separately. Each pot was treated with 150 ml. of the dispersion and then left untouched, except for periodic watering, for two weeks. The pots were then inspected to determine the amount of growth inhibition. It was found that the growth of the tested specimens had been inhibited 100 percent compared with untreated controls.

N-acetyl-5-methyl-2-oxazolidinone, a known compound, when applied to the same species in equal volume at a concentration of 500 parts per million and otherwise under the same conditions, effected zero percent inhibition.

I claim:

1. An N-(halophenoxyacetyl)-2-oxazolidinone having 1 to 3 halogens on the benzene ring, said halogens having an atomic number of 17 to 35, and being free of substituents other than lower alkyl on the oxazolidinone ring.

2. A compound as defined in claim 1 wherein the halogen is chlorine.

3. N-(2,4-dichlorophenoxyacetyl)-5-methyl-2-oxazolidinone.

No references cited.

NICHOLAS S. RIZZO, *Primary Examiner.*